United States Patent Office 3,320,257
Patented May 16, 1967

---

3,320,257
PYRIDO[2,3-d]PYRIMIDINES, PYRIDO[3,2-d]PYRIMIDINES, AND INTERMEDIATES AND PROCESS THEREFOR
George Yohe Lesher, Schodack, N.Y., assignor to Sterling Drug Inc., New York, N.Y., a corporation of Delaware
No Drawing. Filed Apr. 12, 1965, Ser. No. 447,568
22 Claims. (Cl. 260—256.4)

This invention relates to pyrido[23-d]-pyrimidines and pyrido[3,2-d]pyrimidines, and their preparation.

The invention sought to be patented, in composition aspects, resides in the classes of compounds which I designate 5,8 - dihydro-8-(lower-alkyl)-6-Z-5-oxopyrido[2,3-d]pyrimidines and 5,8-dihydro-5-(lower-alkyl)-7-Z-8-oxopyrido[3,2-d]pyrimidines where Z, in each instance, stands for carboxy or lower-carbalkoxy. The tangible embodiments of these composition aspects of the invention possess the inherent applied use characteristics of having antibacterial properties, as determined by standard bacteriological evaluation procedures.

Without limiting the generality of the foregoing, illustrative and preferred embodiments of my 5,8-dihydro-8-(lower - alkyl) - 6 - Z-5-oxopyrido[2,3-d]-pyrimidines and 5,8 - dihydro - 5 - (lower - alkyl)-7-Z-8-oxopyrido[3,2-d] pyrimidines are those of Formulas I and IA, respectively,

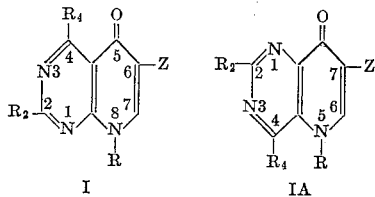

I          IA where R is lower-alkyl, and $R_2$ and $R_4$ are each hydrogen or lower-alkyl. Other embodiments are the compounds of Formula I or IA where $R_2$ and/or $R_4$ represent other substituents which are illustrated by, but not limited to lower-alkoxy, lower-alkylamino, lower-alkylmercapto, phenylmethyl, phenyloxy, phenylamino, phenylmercapto, and the like. Here and elsewhere throughout this specification, it will be understood that the benzene ring of phenyl can bear any kind and number of substituents such as would occur to the man skilled in organic chemistry, e.g., such substituents, solely for illustration and without limiting the generality of the foregoing, including lower-alkyl, lower-alkoxy, lower-alkylmercapto, lower-alkylsulfinyl, lower-alkylsulfonyl, halo, trihalomethyl, nitro, amino, lower-alkylamino, lower-alkanoylamino, hydroxy, and the like. When the benzene ring of phenyl is substituted, there are preferably from one to three substituents which can be in any of the available positions of the benzene ring, and where more than one substituent is present, they can be the same or different and they can be in any of the various position combinations relative to each other. Also, inert substituents, e.g., lower-alkyl, can be present at position 6 of Formula IA. The term "lower-alkyl," as used throughout the specification, e.g., for R, $R_2$ or $R_4$ in Formula I or IA, means lower-alkyl radicals having preferably from one to six carbon atoms which can be arranged as straight or branched chains, and are illustrated by methyl, ethyl, n-propyl, isopropyl, 2-butyl, n-hexyl, and the like. Similarly, unless otherwise indicated, the other above terms defined with the adjective "lower" have from one to six carbon atoms which can be arranged as straight or branched chains.

The term "lower-carbalkoxy," as used throughout this specification, e.g., as one of the meanings for Z in Formula I, means carbalkoxy radicals where the alkoxy portion can be straight- or branch-chained and has from one to six carbon atoms, as illustrated by carbomethoxy, carbethoxy, carbo-n-propoxy, carbisopropoxy, carbo-n-butoxy and carbo-n-hexoxy.

The invention in its process aspect is described as residing in the process of reacting a 5-hydroxy-6-Z-pyrido [2,3-d]pyrimidine or 8-hydroxy-7-Z-pyrido[3,2-d]pyrimidine, where Z is defined as above, with a lower-alkyl ester of a strong acid, i.e., an acid which is practically completely dissociated in aqueous solution, to prepare a 5,8 - dihydro-8-(lower-alkyl)-6-Z-5-oxopyrido[2,3-d]pyrimidine or 5,8-dihydro-5-(lower-alkyl)-7-Z-8-oxopyrido [3,2-d]pyrimidine, illustrated above by Formula I or IA, respectively. Illustrative and preferred esters are lower-alkyl esters of a strong inorganic acid or an organic sulfonic acid, said ester having the formula R-An, where An is the anion of a strong inorganic acid or an organic sulfonic acid, e.g., chloride, bromide, iodide, sulfate, methanesulfonate, benzenesulfonate, para-toluenesulfonate, and the like, and R is lower-alkyl. The chloride, bromide or iodide is preferred because of the more ready availability of the requisite lower-alkyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium bicarbonate, potassium bicarbonate, sodium alkoxides, potassium alkoxides, sodium amide, and the like. The purpose of the acid-acceptor is to take up the hydrogen halide (or HAn) which is split out during the course of the reaction. The reaction can be carried out either in the presence or absence of a suitable solvent, but preferably in a solvent such as a lower-alkanol, acetone, dioxane, dimethylformamide, methyl isobutyl ketone, dimethyl sulfoxide, or a mixture of such solvents, e.g., a mixture of water and a lower-alkanol. The reaction is generally carried out at a temperature between about room temperature (about 25° C.) and 150° C., preferably at reflux, in a lower-alkanol, or in dimethylformamide.

To illustrate the preparation of the preferred compounds of Formula I or IA, my process thus comprises reacting the corresponding 5-hydroxy-6-Z-pyrido[2,3-d]pyrimidine or 8-hydroxy-7-Z-pyrido[3,2-d]pyrimidine of the respective Formula II or IIA

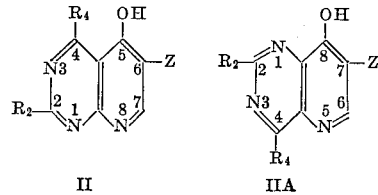

II          IIA where Z, $R_2$ and $R_4$ have the meanings given above for Formulas I and IA, and with an ester having the formula R–An, where R is lower-alkyl and An is an anion of a strong inorganic acid or an organic sulfonic acid, preferably in the presence of an acid-acceptor.

When Z is carboxy, i.e., when the intermediate is a 5-hydroxypyrido[2,3-d]pyrimidine-6-carboxylic acid or an 8-hydroxypyrido[3,2-d]pyrimidine-7-carboxylic acid, the reaction is conveniently carried out by refluxing the acid with a lower-alkyl ester, R–An, preferably the halide, in aqueous ethanol in the presence of potassium or sodium hydroxide to yield the corresponding respective 5,8-dihydro-8-R-5-oxopyrido[2,3-d]pyrimidine - 6 - carboxylic acid or 5,8-dihydro-5-R-8-oxopyrido[3,2-d]pyrimidine-7- carboxylic acid; the same 6-carboxylic acid or 7-carboxylic acid is also obtained using these reaction conditions and a lower-alkyl 5-hydroxypyrido[2,3-d]-pyrimidine-6-carboxylate or lower-alkyl 8-hydroxypyrido[3,2-d]pyrimidine-7-carboxylate, respectively, as the intermediate, the ester hydrolyzing under the reaction conditions to form the acid. If the final product is desired in the form of its lower-alkyl ester, e.g., the ethyl ester, the intermediate ethyl 5-hydroxypyrido[2,3-d]pyrimidine-6-carboxylate or ethyl 8-hydroxypyrido[3,2-d]pyrimidine-7-carboxylate is reacted as above using a non-aqueous medium, for example, using refluxing ethanol as the solvent and sodium ethoxide as the acid-acceptor or using dimethylformamide as the solvent and anhydrous potassium carbonate as the acid-acceptor.

Also within the scope of the invention are salts of my above-described 5,8-dihydro-5-oxo-8-R-pyrido[2,3 - d]pyrimidine-6-carboxylic acids or 5,8-dihydro-8-oxo-5-R-pyrido[3,2-d]pyrimidine-7-carboxylic acids. Preferred types of salts are those having cations which do not increase the toxicity of the compound as a whole toward animal organisms. These comprise the alkali metal salts, e.g., the sodium or potassium salts; the lower-alkaline earth metal salts e.g., magnesium or calcium salts; and, the ammonium or organic amine salts, e.g., diethanolamine or N-methylglucamine salts. Although therapeutically acceptable salts are preferred, other and all cationic salts are within the scope of my invention. All such salts, including those having toxic cations, are useful in characterizing the free acids and as intermediates in purification of the free acids. The salts are prepared from the acids using conventional methods for converting acids into salts.

My invention also comprehends the intermediate 5-hydroxy-6-Z-pyrido[2,3-d]pyrimidines or 8-hydroxy-7-Z-pyrido[3,2-d]pyrimidines illustrated above by Formula II or IIA, respectively. These intermediates were prepared according to the procedure illustrated structurally for preferred embodiments as follows:

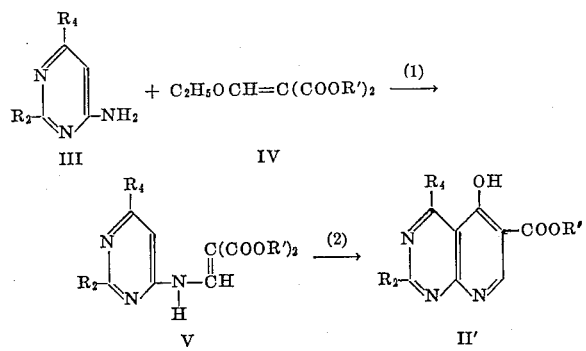

where R' is lower-alkyl, preferably ethyl; and,

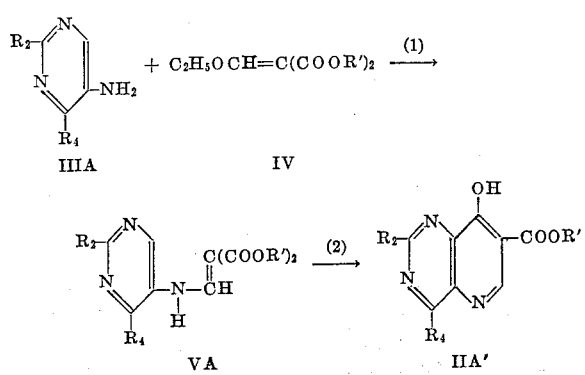

where R' is lower-alkyl, preferably ethyl. In step (1) above a 4-aminopyrimidine (e.g., III) or a 5-aminopyrimidine (e.g., IIIA) is reacted with one molar equivalent of a dialkyl ethoxymethylenemalonate (e.g., IV), preferably the diethyl ester, to yield, respectively, a dialkyl N-(4-pyrimidyl)aminomethylenemalonate (e.g., V) or a dialkyl N-(5 - pyrimidyl)aminomethylenemalonate (e.g., VA) and then cyclizing this compound by heating it in an appropriate solvent, e.g., diethyl phthalate, Dowtherm A (eutectic mixture of diphenyl and diphenyl ether), or mineral oil, to obtain the intermediate lower-alkyl 5-hydroxypyrido[2,3-d]pyrimidine-6-carboxylate (e.g., II') or lower-alkyl 8-hydroxypyrido[3,2-d]pyrimidine-7 - carboxylate (e.g., IIA'), respectively. The corresponding acid (e.g., II' or IIA' where R'=H) is obtained by alkaline hydrolysis of the ester (e.g., II' or IIA' where R' is lower-alkyl). Use of a dialkyl ethoxy-(lower-alkyl)methylenemalonate, e.g., diethyl ethoxymethylenemalonate [of the formula $C_2H_5OC(CH_3)=C(COOC_2H_5)_2$], yields the corresponding ester (e.g., IIA') bearing, respectively, at the 6-position a lower-alkyl substituent, e.g., methyl.

The 5 - hydroxy-6-Z-pyrido[2,3-d]pyrimidines and the 8-hydroxy-7-Z-pyrido[3,2-d]pyrimidines each exist in tautomeric forms. Illustrating this tautomerism in the case of Formula II or IIA, respectively.

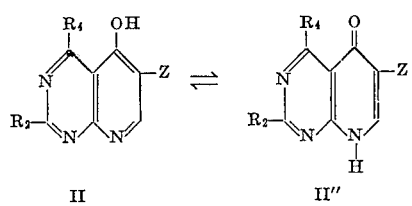

and

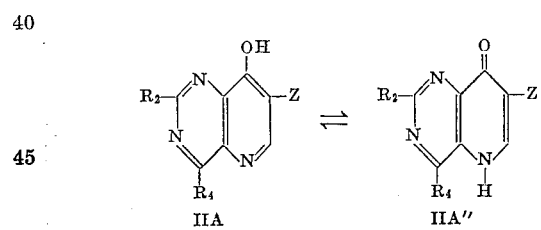

As with all tautomeric systems, the rate of transformation II⇌II″ or IIA⇌IIA″, and the ratio of II/II″ or IIA/IIA″, are dependent on the thermodynamic environment, including the state of aggregation; so that measurements by any particular technique do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as II″ or IIA″, but nevertheless I have preferred to use the names based on structure II or IIA, although it is understood that, in each instance, either or both structures are comprehended.

The molecular structures of the compounds of my invention are established by their mode of synthesis and confirmed by the correspondence of calculated and found values for the elementary analyses for representative examples and by infrared, ultraviolet and NMR spectral analyses.

Tangible physical embodiments of my 5,8-dihydro-5-oxo - 8-R-6-Z-pyrido[2,3-d]pyrimidines or 5,8-dehydro-8- oxo - 5 - R-7-Z-pyrido[3,2-d]pyrimidines have been tested by standard biological evaluation procedures and found to have useful antibacterial properties, e.g., when tested according to standard in vitro bacteriological evaluation procedures they have been found to possess antibacterial activity, for example, against *Eberthella typhi* and *Pseudomonas aeruginosa*, at test concentration levels in the range of about 0.10 to 1.0 mg./cc., as illustrated below in the examples. Preferred embodiments were found to have in vivo activity against Gram-negative bacteria, e.g., *Klebsiella pneumoniae* and *Salmonella typhimurium*, in Swiss mice when administered orally or subcutaneously at dose levels in the range of about 100 to 400 mg./kg./day. The embodiments of my invention can be administered by conventional means.

The following examples will further illustrate the invention, without, however, limiting it thereto.

EXAMPLE 1

(A) *5,8 - dihydro - 8 - ethyl - 2 - methyl - 5 - oxopyrido[2,3 - d]pyrimidine - 6-carboxylic acid.*—To a stirred refluxing mixture containing 6.3 g. of 5-hydroxy-2-methyl - pyrido[2,3-d]pyrimidine-6-carboxylic acid (Ex. 1B), 51 ml. of 10% aqueous potassium hydroxide solution, and 150 ml. of ethanol was added seven 4 ml. portions of ethyl iodide at about forty-five to sixty minute intervals. Two additional 30 ml. portions of 10% aqueous potassium hydroxide solution were added after one and one-half hours and three and one-half hours of refluxing. The total reflux period was six hours. The reaction mixture was concentrated to a volume of about 100 ml. by heating on a steam bath. The concentrate was diluted with water to a volume of about 250 ml. and filtered. The filtrate was acidified with hydrochloric acid. The precipitate was collected, washed successively with water and acetone, air-dried, and recrystallized from dimethylformamide. The resulting crystalline solid was triturated with ethanol and dried in a vacuum oven at 70° C. for six hours to yield 4.9 g. of 5,8-dihydro-8-ethyl - 2 - methyl-5-oxopyrido[2,3-d]pyrimidine-6-carboxylic acid, M.P. 232.6–235.4° C. (corr.).

*Analysis.*—Calcd. for $C_{11}H_{11}N_3O_3$: C, 56.65; H, 4.75; N, 18.02. Found: C, 56.85; H, 4.84; N, 18.13.

5,8 - dihydro - 8 - ethyl - 2 - methyl - 5 - oxopyrido-[2,3-d]pyrimidine-6-carboxylic acid was found to have in vivo activity against *Klebsiella pneumoniae* in mice when administered subcutaneously at 200 mg./kg./day (6 out of 10 mice survived) and when administered orally at 400 mg./kg./day (9 out of 10 mice survived). This compound was found to have in vivo activity against *Salmonella typhimurium* in mice when administered orally at dose levels of 100, 200 and 400 mg./kg./day (5 out of 10, 4 out of 10 and 9 out of 10 mice survived, respectively). This same compound when tested according to standard in vitro bacteriological procedures was found to have bacteriostatic activity against *Eberthella typhi* at a concentration of 0.1 mg./cc.

Following the above procedure of Example 1A and using n-propyl chloride, isobutyl para-toluene-sulfonate or n-hexyl bromide in place of ethyl iodide, there is obtained, respectively, 5,8-dihydro-2-methyl-5-oxo-8-n-propylpyrido[2,3-d]pyrimidine - 6 - carboxylic acid, 5,8-dihydro-8-isobutyl-2-methyl-5-oxopyrido[2,3-d]pyrimidine - 6-carboxylic acid or 5,8-dihydro-8-n-hexyl-2-methyl-5-oxopyrido[2,3-d]pyrimidine-6-carboxylic acid.

Ethyl 5,8-dihydro-8-ethyl-2-methyl-5-oxopyrido-[2,3-d]pyrimidine-6-carboxylate is obtained following the procedure described below in Example 5A using corresponding molar equivalent quantities of ethyl 5-hydroxy-2-methylpyrido[2,3-d]pyrimidine-6-carboxylate, ethyl iodide, anhydrous potassium carbonate and dimethylformamide.

Conversion of 5,8-dihydro-8-ethyl-2-methyl-5-oxopyrido[2,3-d]pyrimidine-6-carboxylic acid to its acid chloride by reaction with phosphorus oxychloride and reaction of the acid chloride with methyl, isobutyl, or n-hexyl alcohol yields, respectively, methyl, isobutyl, or n-hexyl 5,8-dihydro-8-ethyl-2-methyl - 5-oxopyrido[2,3-d]pyrimidine-6-carboxylate.

(B) *5-hydroxy-2-methylpyrido[2,3-d]pyrimidine-6-carboxylic acid.*—To a solution containing 8.2 g. of ethyl 5-hydroxy - 2-methylpyrido[2,3-d]pyrimidine-6-carboxylate (Ex. 1C) dissolved in 400 ml. of ethanol was added 52 ml. of 10% aqueous potassium hydroxide solution and the mixture was heated on a steam bath, letting the solvents evaporate to a volume of about 70 ml. The reaction mixture was filtered; the filtrate acidified with hydrochloric acid; and, the precipitate collected, washed with acetone and dried to yield 6.3 g. (88%) of 5-hydroxy - 2-methylpyrido[2,3-d]pyrimidine - 6-carboxylic acid, M.P. 275° C. with decomposition.

*Analysis.*—Calcd. for $C_9H_7N_3O_3$: C, 52.68; H, 3.44; N, 20.48. Found: C, 52.65; H, 3.62; N, 20.62.

(C) *Ethyl 5-hydroxy-2-methylpyrido[2,3-d]pyrimidine-6-carboxylate.*—A mixture containing 8.4 g. of diethyl N-(2-methyl - 4-pyrimidyl)aminomethylenemalonate (Ex. 1D) and 210 ml. of mineral oil was heated with stirring at 320° C. for about ten minutes and was then allowed to cool with stirring. The solid that separated was collected, triturated with benzene and dried to yield 3.0 g. of crude solid product. Two additional runs were carried out following the above procedure and using, respectively, 14.0 g. and 13.0 g. of diethyl N-(2-methyl-4-pyrimidyl)aminomethylenemalonate, and 350 ml. and 325 ml. of mineral oil to yield, respectively, first crops of 3.1 and 3.6 g. of solid product and second crops of 4.0 and 2.0 g. of solid product. The above combined first crops of solid (3.0+3.1+3.6=9.7 g.) were triturated successively with hot benzene and then acetone. The above combined second crops (4.0+2.0=6.0 g.) were triturated with hot benzene and then recrystallized from ethanol using decolorizing charcoal. The resulting combined materials from the first and second crops were recrystallized from ethanol to yield 8.2 g. of ethyl 5-hydroxy-2-methylpyrido[2,3-d]pyrimidine-6-carboxylate, M.P. 282–284° C.

Following the procedure described above in Example 1C using in place of diethyl N-(2-methyl-4-pyrimidyl) aminomethylenemalonate a molar equivalent quantity of dimethyl, diisobutyl, or di-n-hexyl N-(2-methyl-4-pyrimidyl)aminomethylenemalonate, there is obtained, respectively, methyl, isobutyl, or n-hexyl 5-hydroxy-2-methylpyrido[2,3-d]pyrimidine-6-carboxylate.

(D) *Diethyl N-(2-methyl - 4-pyrimidyl)aminomethylenemalonate.*—A mixture containing 39.0 g. of 4-amino-2-methylpyrimidine and 78.0 g. of diethyl ethoxymethylenemalonate was heated for one hour in an oil bath kept at 130–140° C. The hot oily reaction mixture was allowed to cool to yield a crystalline solid cake. The solid was recrystallized from 300 ml. of 95% ethanol using decolorizing charcoal and air-dried to yield 65.3 g. of diethyl N-(2-methyl-4-pyrimidyl)aminomethylenemalonate, M.P. 103.8–104.5° C. (corr.).

*Analysis.*—Calcd. for $C_{13}H_{17}N_3O_4$: $N_K$, 15.05; $N_{AP}$, 5.02. Found: $N_K$, 14.84; $N_{AP}$, 4.88.

$N_K$=total nitrogen (Kjeldahl); $N_{AF}$=basic nitrogen ($HClO_4$ titration).

Following the procedure described in Example 1D using in place of diethyl ethoxymethylenemalonate a molar equivalent quantity of dimethyl, diisobutyl, or di-n-hexyl ethoxymethylenemalonate, there is obtained, respectively, dimethyl, diisobutyl, or di-n-hexyl N-(2-methyl-4-pyrimidyl)aminomethylenemalonate.

Following the procedure described in Example 1A using corresponding molar equivalent quantities of the appropriate 5-hydroxypyrido[2,3-d]-pyrimidine - 6-carboxylic acid and lower-alkyl ester, preferably halide, the compounds of Table A are obtained.

TABLE A

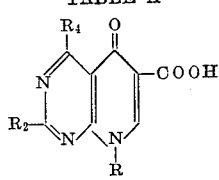

| No. | R | R2 | R4 |
|---|---|---|---|
| 1 | $C_2H_5$ | $C_2H_5S$ | $CH_3$ |
| 2 | $CH_3$ | $CH_3S$ | $CH_3O$ |
| 3 | $C_2H_5$ | H | $C_2H_5$ |
| 4 | $C_2H_5$ | $CH_3O$ | H |
| 5 | $CH_3$ | $n-C_4H_9$ | $CH_3$ |
| 6 | $C_2H_5$ | $C_2H_5$ | H |
| 7 | $C_2H_5$ | $CH_3O$ | $CH_3$ |
| 8 | $n-C_3H_7$ | H | $CH_3$ |
| 9 | $C_2H_5$ | $CH_3S$ | $CH_3NH$ |
| 10 | $CH_3$ | $CH_3$ | $CH_3NH$ |
| 11 | $C_2H_5$ | $CH_3O$ | $CH_3O$ |
| 12 | $C_2H_5$ | $CH_3$ | $CH_3O$ |
| 13 | $C_2H_5$ | H | $n-C_4H_9NH$ |
| 14 | $C_2H_5$ | $n-C_4H_9S$ | $n-C_4H_9$ |
| 15 | $C_2H_5$ | $n-C_6H_{13}S$ | H |
| 16 | $CH_3$ | H | $n-C_6H_{13}O$ |
| 17 | $C_2H_5$ | $n-C_6H_{13}$ | H |
| 18 | $C_2H_5$ | Benzyl | H |
| 19 | $C_2H_5$ | Anilino | H |
| 20 | $C_2H_5$ | $C_6H_5O$ | H |
| 21 | $C_2H_5$ | $C_6H_5S$ | H |
| 22 | $C_2H_5$ | H | Benzyl |

The intermediate 5-hydroxypyrido[2,3-d]pyrimidine-6-carboxylic acids used to prepare the compounds of Table A are prepared in three steps following the procedures described in Examples 1D, 1C and 1B, respectively, starting with the appropriate 4-aminopyrimidine and using corresponding molar equivalent quantities of the appropriate reactants in each step, illustrated as follows for the compound of Example 7: diethyl N-(2-methoxy - 6 - methyl - 4 - pyrimidyl)aminomethylenemalonate is obtained as in Example 1D by reacting 4-amino-2-methoxy-6-methylpyrimidine with diethyl ethoxymethylenemalonate; ethyl 5 - hydroxy - 2 - methoxy - 4 - methylpyrido[2,3-d]pyrimidine-6-carboxylate is obtained in the cyclization step as in Example 1C; 5-hydroxy-2-methoxy-3-methylpyrido[2, 3 -d]pyrimidine-6-carboxylic acid is obtained by hydrolyzing the above ethyl ester as in Example 1B; and, 5,8-dihydro-8-ethyl-2-methoxy-4 - methyl - 5 - oxopyrido[2,3-d]pyrimidine - 6 - carboxylic acid is obtained by reacting 5 - hydroxy - 2 - methoxy - 4 - methylpyrido[2,3-d]pyrimidine - 6 - carboxylic acid with ethyl iodide as in Example 1A. The starting 4-aminopyrimidines are generally known compounds which are prepared by known procedures.

The compounds of Table A in the form of their ethyl esters are obtained following the procedure described below in Example 5A using corresponding molar equivalent quantities of the appropriate ethyl 5-hydroxypyrido[2,3-d]pyrimidine-6-carboxylate, lower alkyl halide, anhydrous potassium carbonate and dimethylformamide.

EXAMPLE 2

5,8 - dihydro - 2,8 - dimethyl - 5 - oxopyrido[2,3-d]pyrimidine-6-carboxylic acid.—To a stirred refluxing mixture containing 4.9 g. of 5-hydroxy-2-methylpyrido[2,3-d]pyrimidine-6-carboxylic acid, 37 ml. of 10% aqueous potassium hydroxide solution and 100 ml. of ethanol was added in 3-4 ml. portions every twenty to thirty minutes an excess of methyl iodide. The refluxing period was one hundred and five minutes. To the reaction mixture was added 3 ml. of 10% aqueous potassium hydroxide solution and the resulting mixture was concentrated to a volume of about 60 ml. Decolorizing charcoal was added to the hot concentrate and the mixture filtered. The filtrate was acidified with 6 N hydrochloric acid to a pH of 3. The solid that separated was collected, washed with water, dried at 80° C. in a vacuum oven, recrystallized from about 600 ml. of ethanol using decolorizing charcoal and dried at 70° C. in a vacuum oven to yield 2.0 g. of 5,8-dihydro-2,8-dimethyl-5-oxopyrido[2,3-d]pyrimidine - 6 - carboxylic acid, M.P. 259.6–260.0° C. (corr.) with decomposition.

Analysis.—Calcd. for $C_{10}H_9N_3O_3$: C, 54.79; H, 4.14; N, 19.17. Found: C, 54.80; H, 4.23; N, 19.34.

EXAMPLE 3

(A) 5,8 - dihydro - 2,4 - dimethyl - 8 - ethyl - 5 - oxopyrido[2,3-d]pyrimidine - 6 - carboxylic acid.—A mixture containing 11 g. of 2,4-dimethyl-5-hydroxypyrido[2,3-d]pyrimidine-6-carboxylic acid (Ex. 3B), 15 ml. of ethyl iodide, 111 ml. of 10% aqueous potassium hydroxide solution, 100 ml. of ethanol and 100 ml. of water was refluxed on a steam bath overnight (about 16 hours). The reaction mixture was acidified with acetic acid; the precipitate was dissolved in dilute aqueous potassium hydroxide solution and reprecipitated with dilute aqueous hydrochloric acid. The solid was recrystallized once from acetonitrile using decolorizing charcoal and once from ethanol to yield 3.5 g. of 5,8-dihydro-2,4 - dimethyl - 8 - ethyl - 5 - oxopyrido[2,3-d]pyrimidine-6-carboxylic acid, M.P. 224.2–225.8° C. (corr.).

Analysis.—Calcd. for $C_{12}H_{13}N_3O_3$: C, 58.30; H, 5.30; N, 17.00. Found: C, 58.49; H, 5.11; N, 16.83.

(B) 2,4 - dimethyl - 5 - hydroxypyrido[2,3 - d]pyrimidine-6-carboxylic acid.—A mixture containing 50 g. of ethyl 2,4 - dimethyl - 5 - hydroxypyrido[2,3 - d]pyrimidine-6-carboxylate (Ex. 3C) and 500 ml. of 10% aqueous potassium hydroxide solution was refluxed for four hours, cooled, extracted with chloroform (extract discarded), and neutralized with a slight excess of acetic acid to yield a gummy precipitate. The precipitate was collected, washed with water, recrystallized from acetic acid using decolorizing charcoal, washed with acetone and air-dried to yield 16 g. of crystalline material which was taken up in warm potassium bicarbonate solution (20 g. in 500 ml. of water) and filtered. The filtrate was acidified with dilute hydrochloric acid and the precipitate was collected, washed successively with water and acetone, air-dried, and then dried at 80° C. in vacuo to yield 13 g. of 2,4-dimethyl - 5 - hydroxypyrido - [2,3 - d]pyrimidine - 6 - carboxylic acid as its monohydrate, M.P. 223.4–230.6° C. (corr.) with decomposition.

Analysis.—Calcd. for $C_{10}H_9N_3O_3$: C, 54.80; H, 4.14; N, 19.16. Found: C, 50.85; H, 4.38; N, 17.75; $H_2O$, 7.19. Found (dry basis): C, 54.79; H, 3.86; N, 19.13.

(C) Ethyl 2,4 - dimethyl - 5 - hydroxypyrido[2,3 - d]-pyrimidine-6-carboxylate.—To one liter of diethyl phthalate heated to reflux (285° C.) was added with stirring 62 g. of diethyl N-(2,6-dimethyl-4-pyrimidyl)-aminomethylenemalonate (Ex. 3D) and gentle refluxing was continued for ten minutes, allowing the ethanol formed by the reaction to distill off. To the hot reaction mixture was added slowly 200 ml. of ethanol with stirring and the resulting mixture allowed to cool to room temperature with stirring. The resulting precipitate was collected, washed twice with n-pentane and air-dried to yield a quantitative yield of ethyl 2,4-dimethyl-5-hydroxypyrido[2,3-d]pyrimidine-6-carboxylate, M.P. 160–170° C.

(D) Diethyl N - (2,6 - dimethyl - 4 - pyrimidyl) - aminomethylenemalonate.—A mixture containing 37 g. of 4-amino-2,6-dimethylpyrimidine and 76 g. of diethyl ethoxymethylenemalonate was heated on a steam bath under reduced pressure for four hours. The hot reaction mixture was poured into cyclohexane (about 200 ml.) and the mixture was boiled on a steam bath, filtered and the filtrate allowed to cool. The resulting precipitate was collected, air-dried, recrystallized from cyclohexane and dried at 80° C. to yield 62 g. (71%) of diethyl N-(2,6-dimethyl - 4 - pyrimidyl)aminomethylenemalonate, M.P. 108–110° C.

EXAMPLE 4

*5,8 - dihydro - 5 - oxo - 2,4,8 - trimethylpyrido[2,3-d]-pyrimidine-6-carboxylic acid.*—A mixture containing 2.5 g. of 2,4 - dimethyl - 5 - hydroxypyrido[2,3 - d]pyrimidine-6-carboxylic acid, 3 ml. of methyl iodide, 20 ml. of 10% aqueous potassium hydroxide solution, 20 ml. of ethanol and 20 ml. of water was refluxed for five hours. The reaction mixture was allowed to cool and was acidified with an excess of aqueous hydrochloric acid. The resulting precipitate was collected, recrystallized from acetone and air-dried to yield 0.5 g. of 5,8-dihydro-5-oxo-2,4,8 - trimethylpyrido[2,3 - d]pyrimidine - 6 - carboxylic acid, M.P. 264.8–265.0° C. (corr.) with decomposition.

*Analysis.*—Calcd. for $C_{11}H_{11}N_3O_3$: C, 56.63; H, 4.76; N, 18.02. Found: C, 56.88; H, 4.96; N, 17.89.

5,8 - dihydro - 5 - oxo - 2,4,8 - trimethylpyrido[2,3 - d]-pyrimidine-6-carboxylic acid was found to have in vivo activity against *Klebsiella pneumoniae* in mice when administered orally at 200 mg./kg./day (6 out of 10 mice survived).

EXAMPLE 5

(A) *Ethyl 5,8 - dihydro - 8 - oxo - 2,4,5 - trimethyl-pyrido[3,2-d]pyrimidine-7-carboxylate.*—A mixture containing 19.8 g. of ethyl 2,4-dimethyl-8-hydroxypyrido[3,2-d]pyrimidine-7-carboxylate, 500 ml. of dimethylformamide and 22 g. of anhydrous potassium carbonate was heated on a steam bath with stirring for fifteen minutes. To the mixture was added 15 ml. of methyl iodide and the resulting mixture was heated on a steam bath with stirring for two hours. The reaction mixture was filtered and the filtrate concentrated to dryness in vacuo. The residue was triturated with 400 ml. of boiling chloroform and the remaining insoluble material filtered off. The filtrate was shaken with 150 ml. of water in a separatory funnel whereupon solid separated. The solid was collected and recrystallized from three liters of acetone, using decolorizing charcoal, to yield 6.2 g. of white solid. The solid was dissolved in 200 ml. of boiling water and the solution allowed to cool to 40° C. The granular white solid that separated was isolated by decanting the liquid which was chilled to yield a cottony white solid which was collected. Both solids were dried in a vacuum oven at 50° C. The granular solid was found to be the product, ethyl 5,8 - dihydro - 8 - oxo - 2,4,5 - trimethylpyrido[3,2-d]pyrimidine-7-carboxylate at its monohydrate, M.P. 266–267.5° C.

*Analysis.*—Calcd. for $C_{13}H_{15}N_3O_3 \cdot H_2O$: C, 56.31; H, 5.45; N, 15.16; $H_2O$, 6.50. Found: C, 56.17; H, 5.34; N, 15.22; $H_2O$, 6.50.

The cottony white solid (5.3 g.) also was found to be the product, ethyl 5,8-dihydro-8-oxo - 2,4,5 - trimethylpyrido[3,2-d]pyrimidine - 7 - carboxylate, M.P. 261.6–262.0° C. (corr.) with decomposition.

*Analysis.*—calcd. for $C_{13}H_{15}N_3O_3$: C, 59.76; H, 5.79; N, 16.08. Found: C, 59.31; H, 5.83; N, 16.05; $H_2O$, 0.49%. Found (dry basis): C, 59.60; H, 5.80; N, 16.13.

Ethyl 5,8 - dihydro-8-oxo-2,4,5-trimethylpyrido[3,2-d]pyrimidine-7-carboxylate when tested according to standard in vitro bacteriological procedures was found to have bacteriostatic activity against *Pseudomonas aeruginosa* at a concentration of 0.1 mg./cc.

Following the procedure described in Example 5A and using n-propyl chloride, isobutyl para-toluene-sulfonate or n-hexyl bromide in place of methyl iodide, there is obtained, respectively, ethyl 5,8-dihydro-2,4-dimethyl-8-oxo-5-n-propylpyrido[3,2-d]pyrimidine - 7 - carboxylate, ethyl 5,8-dihydro - 2,4 - dimethyl-5-isobutyl-8-oxopyrido-[3,2-d]pyrimidine-7-carboxylate or ethyl 5,8-dihydro-2,4-dimethyl - 5 - n - hexyl-8-oxopyrido[3,2-d]pyrimidine-7-carboxylate. The corresponding 7-carboxylic acids are obtained by alkaline hydrolysis of the above esters.

Following the procedure described in Example 5A using in place of ethyl 2,4-dimethyl-8-hydroxypyrido-[3,2-d]pyrimidine-7-carboxylate a molar equivalent quantity of methyl, isobutyl, or n - hexyl 2,4 - dimethyl - 8-hydroxypyrido[3,2-d]pyrimidine-7-carboxylate, there is obtained, respectively, methyl, isobutyl, or n-hexyl 5,8-dihydro-8-oxo - 2,4,5 - trimethylpyrido[3,2-d]pyrimidine-7-carboxylate.

(B) *Ethyl 2,4-dimethyl-8-hydroxypyrido[3,2-d]pyrimidine-7-carboxylate.*—To a mixture containing 1.5 liters of mineral oil and 1.0 liter of Dowtherm A heated at 260–265° C. was added over a period of five minutes 88 g. of diethyl N-(2,4-dimethyl - 5 - pyrimidyl)aminomethylenemalonate and the resulting mixture was heated at 267° C. for six minutes. The reaction mixture was cooled to 240° C. by addition of ethanol and then allowed to cool with stirring to room temperature. The resulting precipitate was collected, triturated with hot n-hexane and dried to yield 48.2 g. (66%) of ethyl 2,4-dimethyl-8-hydroxypyrido[3,2-d]pyrimidine - 7 - carboxylate, M.P. 256–258° C. Half of this material (24 g.) was combined with a 39.8 g. portion obtained following the above procedure using the same quantities of reactants and solvent but using a heating period of seven rather than six minutes; and, the combined material was recrystallized once from four liters of ethanol using decolorizing charcoal and a second time from about 600 ml. of dimethylformamide to yield 36.4 g. of ethyl 2,4-dimethyl-8-hydroxypyrido[3,2-d]pyrimidine - 7 - carboxylate, M.P. 252.0–253.0° C. (corr.) with decomposition.

*Analysis.*—Calcd. for $C_{12}H_{13}N_3O_3$: C, 58.29; H, 5.30; N, 17.00. Found: C, 58.19; H, 5.22; N, 17.10.

Following the procedure described in Example 5B using in place of diethyl N-(2,4-dimethyl-5-pyrimidyl)-aminomethylenemalonate a molar equivalent quantity of dimethyl, diisobutyl, or di-n-hexyl N-(2,4-dimethyl-5-pyrimidyl)aminomethylenemalonate, there is obtained, respectively, methyl, isobutyl, or n-hexyl 2,4-dimethyl-8-hydroxypyrido[3,2-d]pyrimidine-7-carboxylate.

(C) *Diethyl N-(2,4-dimethyl-5-pyrimidyl)aminomethylenemalonate.*—A mixture containing 24 g. of 5-amino-2,4-dimethylpyrimidine and 42 g. of diethyl ethoxymethylenemalonate was heated on a steam bath for fifteen minutes (solidified after ten minutes). The reaction mixture was dissolved in hot benzene (volume of solution about 250 ml.) and solution allowed to cool. The resulting precipitate was collected, washed successively with cold benzene and n-hexane, and recrystallized again from benzene to yield 38.9 g. of diethyl N-(2,4-dimethyl-5 - pyrimidyl)aminomethylenemalonate, M.P. 147.0–148.2° C. (corr.).

*Analysis.*—Calcd. for $C_{14}H_{19}N_3O_4$: C, 57.32; H, 6.53; N, 14.33. Found: C, 57.32; H, 6.65; N, 14.56.

Following the procedure described in Example 5C using in place of diethyl ethoxymethylenemalonate a molar equivalent quantity of dimethyl, diisobutyl, or di-n-hexyl ethoxymethylenemalonate, there is obtained, respectively, dimethyl, diisobutyl, or di-n-hexyl N-(2,4-dimethyl-5-pyrimidyl)aminomethylenemalonate.

Diethyl N-(2,4-dimethyl-5-pyrimidyl)aminomethylenemalonate when administered orally to mice using a modified procedure of the photocell activity cage method of Dews [Brit. J. Pharmacol. 8, 46 (1953)] was found to have psychomotor depressant properties at a dose level as low as 30 mg./kg. of body weight.

Following the procedure described in Example 5A using corresponding molar equivalent quantities of the appropriate ethyl 8-hydroxypyrido[3,2-d]pyrimidine-7-carboxylate and lower-alkyl ester, preferably halide, the compounds of Table B are obtained.

TABLE B

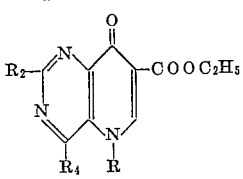

| No. | R | R₂ | R₄ |
|---|---|---|---|
| 1 | C₂H₅ | H | CH₃NH |
| 2 | CH₃ | C₂H₅ | CH₃ |
| 3 | C₂H₅ | H | CH₃ |
| 4 | C₂H₅ | OCH₃ | H |
| 5 | C₂H₅ | CH₃S | CH₃ |
| 6 | CH₃ | n-C₃H₇NH | n-C₃H₇NH |
| 7 | C₂H₅ | n-C₆H₁₃O | H |
| 8 | CH₃ | CH₃O | CH₃O |
| 9 | C₂H₅ | C₂H₅O | C₂H₅O |
| 10 | CH₃ | C₂H₅ | CH₃ |
| 11 | C₂H₅ | CH₃ | CH₃O |
| 12 | n-C₃H₇ | CH₃ | H |
| 13 | C₂H₅ | CH₃S | H |
| 14 | C₂H₅ | n-C₄H₉S | C₂H₅ |
| 15 | C₂H₅ | n-C₆H₁₃ | C₂H₅S |
| 16 | CH₃ | H | n-C₆H₁₃ |
| 17 | C₂H₅ | H | H |
| 18 | C₂H₅ | Benzyl | H |
| 19 | C₂H₅ | Anilino | H |
| 20 | C₂H₅ | C₆H₅O | H |
| 21 | C₂H₅ | C₆H₅S | H |
| 22 | C₂H₅ | H | Benzyl |

The intermediate ethyl 8-hydroxypyrido[3,2-d]pyrimidine-7-carboxylates used to prepare the compounds of Table B are prepared in two steps following the procedures described in Examples 5C and 5B, respectively, starting with the appropriate 5-aminopyrimidine and using corresponding molar equivalent quantities of the appropriate reactants in each step, illustrated as follows for the compound of Example 9: diethyl N-(2,4-diethoxy-5-pyrimidyl)aminomethylenemalonate is obtained as in Example 5C by reacting 5-amino-2,4-diethoxypyrimidine with diethyl ethoxymethylenemalonate; ethyl 2,4-diethoxy-8-hydroxypyrido[3,2-d]pyrimidine-7-carboxylate is obtained in the cyclization step as in Example 5B; and, ethyl 2,4-diethoxy-5,8-dihydro-5-methyl-8-oxopyrido[3,2-d]pyrimidine-7-carboxylate is obtained by reacting ethyl 2,4-diethoxy-8-hydroxypyrido[3,2-d]pyrimidine-7-carboxylate with methyl iodide as in Example 5A. The starting 5-aminopyrimidines are generally known compounds which are prepared by known procedures.

The compounds of Table B are converted into their corresponding 7-carboxylic acids following the procedure described in Example 6B hereinbelow, for example, 2,4-diethoxy-5,8-dihydro-5-methyl-8-oxopyrido[3,2-d]pyrimidine-7-carboxylic acid is obtained by alkaline hydrolysis of the corresponding ethyl ester (No. 9 of Table B).

EXAMPLE 6

(A) *Ethyl 5,8-dihydro-8-oxo-2,4,5-trimethylpyrido[3,2-d]pyrimidine-7-carboxylate.*—To a stirred solution containing 19.8 g. of ethyl 2,4-dimethyl-8-hydroxypyrido[3,2-d]pyrimidine-7-carboxylate, 500 ml. of dimethylformamide and 22 g. of anhydrous potassium carbonate heated on a steam bath was added 20 ml. of methyl iodide, and the resulting mixture was heated on a steam bath with stirring for two and one-half hours. The hot reaction mixture was filtered to remove inorganic solids. The filtrate was concentrated to a volume of about 100 ml. and poured into one liter of ether with stirring. The resulting precipitate was collected, washed with ether and dried. The solid was triturated with two 200 ml. portions of chloroform and the combined chloroform extracts were washed with water (about 150 ml.) whereupon a solid separated. The solid was collected and crystallized from water to yield ethyl 5,8-dihydro-8-oxo-2,4,5-trimethylpyrido[3,2-d]pyrimidine-7-carboxylate, M.P. 266–268° C.

(B) *5,8-dihydro-8-oxo-2,4,5-trimethylpyrido[3,2-d]pyrimidine-7-carboxylic acid.*—The ethyl 5,8-dihydro-8-oxo-2,4,5-trimethylpyrido[3,2-d]pyrimidine-7-carboxylate of Example 6A was treated with 30 ml. of aqueous potassium hydroxide solution and 30 ml. of water, and the mixture was heated on a steam bath for six hours. The reaction mixture was neutralized with 6 N hydrochloric acid and chilled. The precipitate was collected, washed with water and dried at 60° C. in a vacuum oven to yield 2.0 g. of 5,8-dihydro-8-oxo-2,4,5-trimethylpyrido[3,2-d]pyrimidine-7-carboxylic acid, M.P. 266.0–266.5° C. (corr.) with decomposition.

*Analysis.*—Calcd. for $C_{11}H_{11}N_3O_3$: C, 56.65; H, 4.75; N, 18.02. Found: C, 56.73; H, 4.99; N, 17.93.

I claim:

1. 5,8-dihydro-8-(lower-alkyl)-6-Z-5-oxopyrido[2,3-d]pyrimidine where Z is a member selected from the group consisting of carboxy and lower-carbalkoxy, and the 7-position of the pyrido ring is unsubstituted or substituted by lower-alkyl.

2. A compound of the formula

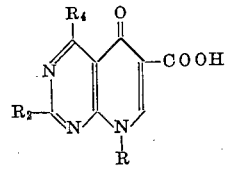

where R is lower-alkyl, and, $R_2$ and $R_4$ are each a member selected from the group consisting of hydrogen and lower-alkyl.

3. 5,8-dihydro-8-ethyl-2-methyl-5-oxopyrido[2,3-d]pyrimidine-6-carboxylic acid.

4. 5,8-dihydro-2,8-dimethyl-5-oxopyrido[2,3-d]pyrimidine-6-carboxylic acid.

5. 5,8-dihydro-2,4-dimethyl-8-ethyl-5-oxopyrido[2,3-d]pyrimidine-6-carboxylic acid.

6. 5,8-dihydro-5-oxo-2,4,8-trimethylpyrido[2,3-d]pyrimidine-6-carboxylic acid.

7. A process for the preparation of 5,8-dihydro-8-(lower-alkyl)6-Z-5-oxopyrido[2,3-d]pyrimidine where Z is a member selected from the group consisting of carboxy and lower-carbalkoxy, which comprises reacting the corresponding 5-hydroxy-6-Z-pyrido[2,3-d]pyrimidine with an ester of the formula R–An, where R is lower-alkyl and An is an anion of an acid selected from the group consisting of a strong inorganic acid and an organic sulfonic acid, in the presence of an acid-acceptor.

8. A process for the preparation of a compound of the formula

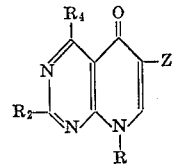

where R is lower-alkyl, Z is a member selected from the group consisting of carboxy and lower-carbalkoxy, and, $R_2$ and $R_4$ are each a member selected from the group consisting of hydrogen and lower-alkyl, which comprises reacting the corresponding 5-hydroxy-6-Z-pyrido[2,3-d]pyrimidine with a lower-alkyl halide in the presence of an acid-acceptor.

9. 5,8-dihydro-5-(lower-alkyl)-7-Z-8-oxopyrido[3,2-d]pyrimidine where Z is a member selected from the group consisting of carboxy and lower-carbalkoxy, and the 6-position of the pyrido ring is unsubstituted or substituted by lower-alkyl.

10. A compound of the formula

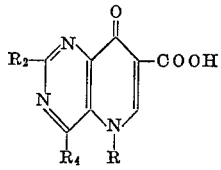

where R is a lower-alkyl, and, $R_2$ and $R_4$ are each a member selected from the group consisting of hydrogen and lower-alkyl.

11. Ethyl 5,8 - dihydro-8-oxo-2,4,5 - trimethylpyrido [3,2-d]pyrimidine-7-carboxylate.

12. 5,8-dihydro-8-oxo - 2,4,5 - trimethylpyrido[3,2-d] pyrimidine-7-carboxylic acid.

13. A process for the preparation of 5,8-dihydro-5-(lower-alkyl)-7-Z-8-oxopyrido[3,2-d]pyrimidine where Z is a member selected from the group consisting of carboxy and lower-carbalkoxy which comprises reacting the corresponding 8 - hydroxy-7-Z-pyrido[3,2-d]pyrimidine with an ester of the formula R–An, where R is lower-alkyl and An is an anion of an acid selected from the group consisting of a strong inorganic acid and an organic sulfonic acid, in the presence of an acid-acceptor.

14. A process for the preparation of a compound of the formula

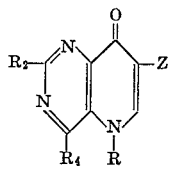

where R is lower-alkyl, Z is a member selected from the group consisting of carboxy and lower-carbalkoxy, and, $R_2$ and $R_4$ are each a member selected from the group consisting of hydrogen and lower-alkyl, which comprises reacting the corresponding 8-hydroxy-7-Z-pyrido[3,2-d]pyrimidine with a lower-alkyl halide in the presence of an acid-acceptor.

15. 5-hydroxy-6-Z-pyrido[2,3-d]pyrimidine where Z is a member selected from the group consisting of carboxy and lower-carbalkoxy, and the 7-position of the pyrido ring is unsubstituted or substituted by lower-alkyl.

16. A compound of the formula

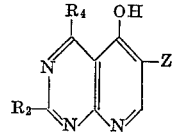

where Z is lower-carbalkoxy, and $R_2$ and $R_4$ are each a member selected from the group consisting of hydrogen and lower-alkyl.

17. 2,4-dimethyl-5-hydroxypyrido[2,3-d]pyrimidine - 6-carboxylic acid.

18. Ethyl 5 - hydroxy-2-methylpyrido[2,3-d]pyrimidine-6-carboxylate.

19. 8-hydroxy-7-Z-pyrido[3,2-d]pyrimidine where Z is a member selected from the group consisting of carboxy and lower-carbalkoxy, and the 6-position of the pyrido ring is unsubstituted or substituted by lower-alkyl.

20. A compound of the formula

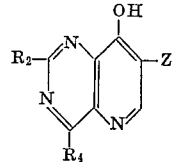

where Z is lower-carbalkoxy, and $R_2$ and $R_4$ are each a member selected from the group consisting of hydrogen and lower-alkyl.

21. Ethyl 2,4-dimethyl-8-hydroxypyrido[3,2-d]pyrimidine-7-carboxylate.

22. Diethyl N-(2,4 - dimethyl - 5- pyrimidyl)-aminomethylenemalonate.

References Cited by the Examiner

Bredereck et al., Chem. Ber., vol. 96, No. 7, 1963, pages 1868–1872.

ALEX MAZEL, *Primary Examiner.*

MARY O'BRIEN, *Assistant Examiner.*

UNITED STATES PATENT OFFICE
CERTIFICATE OF CORRECTION

Patent No. 3,320,257                       May 16, 1967

George Yohe Lesher

It is hereby certified that error appears in the above numbered patent requiring correction and that the said Letters Patent should read as corrected below.

Column 1, line 10, for "[23-d]" read -- [2,3-d] --; column 4, line 21, for "pyridol" read -- pyrido --; line 75, for "dehydro" read -- dihydro --; column 7, line 48, for "methoxy-3-methylpyrido" read -- methoxy-4-methylpyrido --; column 9, line 52, for "at" read -- as --; column 13, line 9, for "is a lower-alkyl" read -- is lower-alkyl --.

Signed and sealed this 9th day of January 1968.

(SEAL)
Attest:

Edward M. Fletcher, Jr.                    EDWARD J. BRENNER

Attesting Officer                         Commissioner of Patents